Patented June 26, 1945

2,379,310

UNITED STATES PATENT OFFICE 2,379,310

MANUFACTURE OF CELLULOSE ESTERS HAVING A HIGH PROPIONYL OR BUTYRYL CONTENT

Carl J. Malm and Loring W. Blanchard, Jr., Rochester, N. Y., assignors to Eastman Kodak Company, Rochester, N. Y., a corporation of New Jersey No Drawing. Application April 20, 1942, Serial No. 439,720

9 Claims. (Cl. 260—225)

This invention relates to the manufacture of high viscosity cellulose esters having a high content of propionyl and/or butyryl (such as at least 30 per cent) in which a high anhydride concentration and a zinc chloride catalyst are employed in the esterification bath.

In the making of cellulose esters having a high propionyl or butyryl content, much care has been necessary to prepare high viscosity products due to the sluggish nature of propionic and butyric anhydrides, compared with acetic anhydride, which, with the usual esterification procedures, necessitates severe reaction conditions.

One object of our invention is to provide a process for making high propionyl or high butyryl cellulose esters of high viscosity in which the rigid temperature control formerly thought necessary can be dispensed with. Other objects of our invention will appear herein.

We have found that in the making of high propionyl or butyryl cellulose esters with an anhydride concentration in the esterification mixture of at least 60 per cent and zinc chloride as the catalyst, cellulose may be easily esterified with butyric or propionic anhydride at an elevated temperature without detrimentally affecting the physical properties of the final product. With sulfuric acid catalyst, which has heretofore been thought necessary for preparing high propionyl or high butyryl cellulose esters of good quality, careful restriction of the temperature has been necessary. By our invention, in which elevated temperatures are employed, a smooth homogeneous mass is obtained, and the higher temperature also enhances the solvent action of the liquid on the cellulose ester formed, facilitating the operation.

The cellulose which is employed as the starting material in a process according to our invention is preferably one which has been activated by pretreatment with a lower fatty acid but which contains but a comparatively small proportion of fatty acid when mixed with the esterification reagents. The pretreatment of cellulose, described and claimed in Malm Patent No. 2,342,415, is admirably suited for preparing cellulose for esterification in a process in accordance with our invention. Other pretreatment processes of a related nature and which are also eminently suited for activating the cellulose for esterification by our process are those described and claimed in Malm Patents Nos. 2,358,080 and 2,342,416.

Another method of pretreatment which may be employed to activate cellulose which is suitable for use in our process is that described and claimed in Malm Patent No. 2,150,690, particularly when the treatment leaves but a very small proportion of pretreatment liquid on the cellulose.

If desired the cellulose to be esterified may be presoaked in acetic acid with or without a small proportion of sulfuric acid, and after the fiber has been activated to the desired degree, the liquid is removed from the cellulose, such as by pressing, centrifuging, or by a washing operation that will leave the cellulose in active condition and with only a small proportion of acid thereon. It is desirable that the cellulose employed in our esterification process contain as little fatty acid as possible so that a high anhydride concentration may be employed without an excessive ratio of liquid to cellulose in the esterification bath. Also, the proportion of sulfuric acid on the cellulose, if any is present, should be less than ½ per cent so that no appreciable effect is exerted thereby under the esterification conditions employed.

Another pretreatment method which may be employed is that described and claimed in Gardner Patent No. 2,113,301, dated April 5, 1938, providing that the liquid remaining on the cellulose is not too great. Ordinarily it is desirable that the cellulose contain less than two parts of pretreating liquid per part of cellulose.

One of the features of our esterification process is that the anhydride concentration in the esterification liquid should be at least 60 per cent. In order to carry out such an esterification economically, it is desirable to restrict the ratio of liquid to cellulose therein to less than 6:1, such as 4.75:1. This is only possible by employing a cellulose starting material having after its pretreatment only a very low proportion of retained acid mixed therewith, preferably ¾ part per part of cellulose.

An esterification using a low liquid to cellulose ratio for preparing cellulose esters having a high propionyl or butyryl content together with a sulfuric acid catalyst is described and claimed in Blanchard application Serial No. 315,619, filed January 25, 1940. In the process of that application, the maximum temperatures to obtain high viscosity cellulose esters are fairly critical. Our invention possesses the advantages of a high anhydride concentration, as shown in that application, but in addition performs the esterification under most favorable conditions but without any derogatory action upon the product prepared thereby.

Our invention includes, as a feature, the esterification of the cellulose in which all or substantially all of the esterification catalyst employed is zinc chloride. The zinc chloride is ordinarily employed in the esterification mass in an amount from 15-100 per cent, based on the weight of the cellulose, using as a maximum temperature for the esterification one selected from the range 100-160° F.

Our invention is adapted to the preparation of both the simple esters, such as cellulose propionate and cellulose butyrate, and the mixed esters, such as cellulose propionate butyrate as well as those containing in addition to the fatty acid groups of 3-4 carbon atoms (propionyl and/or butyryl), other acyl groups such as acetyl. If, for instance, the preparation of a cellulose butyrate is desired, one may proceed by using only ½ part of butyric acid for 1 part of cotton in the pretreatment and 4 parts of butyric anhydride in the esterification. The anhydride concentration at the beginning of the reaction is 88.9 per cent, and at the end of the esterification there is only 1.37 parts of liquid for 1 part of cellulose tributyrate. Due to the high temperature at the end of the reaction, the solution is smooth and homogeneous in spite of the high fundamental viscosity of the cellulose butyrate so prepared.

Our process in its broadest aspects comprises taking refined cellulose, such as refined cotton linters or wood pulp, which has been pretreated or activated to the desired degree but which contains no more than 2 parts of pretreating liquid to 1 of cellulose and no more than ½ per cent of sulfuric acid or other catalyst and mixing it with propionic and/or butyric anhydride and with zinc chloride so that at least 60 per cent of the liquid present is anhydride and the zinc chloride is 15-100 per cent of the cellulose and reacting together the anhydride and the cellulose so that a maximum temperature between 100° F. and 160° F. is reached.

The following examples illustrate our invention:

*Example I*

A mixture of 20 pounds of butyric acid and 2 pounds of water was added to 20 pounds of cotton linters, and the mass was mixed together for 1½ hours at a temperature of 130° F. A further addition of 10 pounds of linters was made, and the mass was mixed for two hours and cooled to 100° F.

140 pounds of butyric anhydride was added, and the mass was cooled to 70° F. 20 pounds of zinc chloride was added, and the reaction temperature was gradually raised from 70° F. to 125° F. over a period of eight hours. The temperature of 125° F. was maintained for twelve hours. The product formed had a tetrachlorethane first-stage viscosity (2:1 dilution) of 96 seconds. A mixture of 30 pounds of water, 120 pounds of acetic acid and 500 cc. of hydrochloric acid was added to the completed reaction mixture and the material was hydrolyzed at 100° F. for six days. The ester was then precipitated from the mass with aqueous acid. It had an acetone viscosity at 10 per cent concentration of over 300 centipoises and contained 50 per cent butyryl.

*Example II*

20 pounds of cotton linters was mixed for one hour at 100° F. with 20 pounds of propionic acid and 10 cc. of sulfuric acid. 10 pounds of cotton linters was then added and the pretreatment was continued for two hours. A mixture of 105 pounds of propionic anhydride, 15 pounds of propionic acid, and 10 pounds of zinc chloride was mixed with the mass and the temperature was slowly raised from 100° F. to 140° F. over a period of 5½ hours, at which temperature the mass was maintained for 5¾ hours longer. The cellulose had dissolved forming a smooth, homogeneous dope. A mixture of 30 pounds of water and 150 pounds of acetic acid was added, followed by the addition of 100 cc. of hydrochloric acid in five pounds of acetic acid to speed up the rate of hydrolysis. One portion of the mass was hydrolyzed for 150 hours, giving a cellulose propionate having 50.5 per cent propionyl and a viscosity, at 10 per cent acetone concentration, of 373 cps. The other portion of the mass was hydrolyzed for 205 hours, and the propionyl content was 49.5 per cent, and the viscosity 405 cps. After the hydrolysis had been completed in each case, the esters were precipitated in aqueous lower fatty acid and were washed and dried.

We claim:

1. A method of preparing a high viscosity cellulose ester containing at least 30% of saturated fatty acid groups of 3-4 carbon atoms, which comprises esterifying, at a temperature reaching and maintained at 125-160° F., 1 part of cellulose with less than 6 parts of an esterification mixture of which at least 60% is anhydride of saturated fatty acid of 3-4 carbon atoms, which mixture contains 15-100% (based on the weight of the cellulose) of zinc chloride as the esterification catalyst, is substantially free of sulfuric acid and contains a sufficient proportion of saturated fatty acid groups of 3-4 carbon atoms so as to result in a content of those groups in the product of at least 30 per cent.

2. A method of preparing a high viscosity cellulose ester containing at least 30% butyryl, which comprises esterifying at a temperature reaching and maintained at 125-160° F., 1 part of cellulose with less than 6 parts of an esterification mixture of which at least 60% is butyric anhydride, which mixture contains 15-100% (based on the weight of the cellulose) of zinc chloride as the esterification catalyst, is substantially free of sulfuric acid and contains a sufficient portion of butyryl so as to result in a butyryl content in the product of at least 30 per cent.

3. A method of preparing a cellulose ester having a butyryl content of approximately 50% and a 10% acetone viscosity of more than 300 centipoises, which comprises esterifying at a temperature reaching and maintained at approximately 125° F., 1 part of cellulose with less than 6 parts of an esterification mixture of which at least 60% is butyric anhydride and in which substantially the entire acyl present is butyryl, which mixture contains approximately 65% (based on the weight of the cellulose) of zinc chloride and is substantially free of sulfuric acid.

4. A method of preparing a high viscosity cellulose ester containing at least 30% propionyl, which comprises esterifying at a temperature reaching and maintained at 125-160° F., 1 part of cellulose with less than 6 parts of an esterification mixture of which at least 60% is propionic anhydride, which mixture contains 15-100% (based on the weight of the cellulose) of zinc chloride as the esterification catalyst, is substantially free of sulfuric acid and contains a sufficient portion of propionyl so as to result in a propionyl content in the product of at least 30%.

5. A method of preparing a high viscosity cellulose ester containing at least 30% of saturated fatty acid groups of 3-4 carbon atoms which comprises esterifying at a temperature reaching and maintained at 125-160° F., 1 part of cellulose, which has been pretreated with acetic acid, with less than 6 parts of an esterification mixture of which at least 60% is anhydride of saturated fatty acid of 3-4 carbon atoms, which mixture contains 15-100% (based on the weight of the cellulose) of zinc chloride as the esterification catalyst, is substantially free of sulfuric acid and contains a sufficient proportion of saturated fatty acid groups of 3-4 carbon atoms so as to result in a content of those groups in the product of at least 30%.

6. A method of preparing a high viscosity cellulose ester containing at least 30% of saturated fatty acid groups of 3-4 carbon atoms, which comprises esterifying, at a temperature reaching and maintained at 125-160° F., 1 part of cellulose with approximately 4.75 parts of an esterification mixture of which at least 60% is anhydride of saturated fatty acid of 3-4 carbon atoms, which mixture contains 15-100% (based on the weight of the cellulose) of zinc chloride as the esterification catalyst, is substantially free of sulfuric acid and contains a sufficient proportion of saturated fatty acid groups of 3-4 carbon atoms so as to result in a content of those groups in the product of at least 30%.

7. A method of preparing a high viscosity cellulose ester containing at least 30% butyryl, which comprises esterifying at a temperature reaching and maintained at 125-160° F., 1 part of cellulose with approximately 4.75 parts of an esterification mixture of which at least 60% is butyric anhydride, which mixture contains 15-100% (based on the weight of the cellulose) of zinc chloride as the esterification catalyst, is substantially free of sulfuric acid and contains a sufficient portion of butyryl so as to result in a butyryl content in the product of at least 30%.

8. A method of preparing a high viscosity cellulose ester containing at least 30% of saturated fatty acid groups of 3-4 carbon atoms which comprises esterifying at a temperature reaching and maintained at 125-160° F., 1 part of cellulose, which has been pretreated with acetic acid, with approximately 4.75 parts of an esterification mixture of which at least 60% is anhydride of saturated fatty acid of 3-4 carbon atoms, which mixture contains 15-100% (based on the weight of the cellulose) of zinc chloride as the esterification catalyst, is substantially free of sulfuric acid and contains a sufficient proportion of saturated fatty acid groups of 3-4 carbon atoms so as to result in a content of those groups in the product of at least 30%.

9. A method of preparing a high viscosity cellulose ester containing at least 30% of saturated fatty acid groups of 3-4 carbon atoms, which comprises esterifying, at a temperature reaching and maintained at approximately 125° F., 1 part of cellulose with less than 6 parts of an esterification mixture of which at least 60% is anhydride of saturated fatty acid of 3-4 carbon atoms, which mixture contains 15-100% (based on the weight of the cellulose) of zinc chloride as the esterification catalyst, is substantially free of sulfuric acid and contains a sufficient proportion of saturated fatty acid groups of 3-4 carbon atoms so as to result in a content of those groups in the product of at least 30%.

CARL J. MALM.
LORING W. BLANCHARD, Jr.